US011198446B2

(12) United States Patent
Garcia et al.

(10) Patent No.: US 11,198,446 B2
(45) Date of Patent: Dec. 14, 2021

(54) ON-BOARD VEHICLE QUERY SYSTEM

(71) Applicant: Faraday & Future Inc., Gardena, CA (US)

(72) Inventors: Mario R. Garcia, Long Beach, CA (US); Eric M. Turano, San Pedro, CA (US); Jungseop Kim, Cypress, CA (US)

(73) Assignee: Faraday & Future Inc., Gardena, CA (US)

( * ) Notice: Subject to any disclaimer, the term of this patent is extended or adjusted under 35 U.S.C. 154(b) by 119 days.

(21) Appl. No.: 16/240,571

(22) Filed: Jan. 4, 2019

(65) Prior Publication Data
US 2020/0216089 A1 Jul. 9, 2020

(51) Int. Cl.
*B60W 50/10* (2012.01)
*G10L 15/22* (2006.01)
*G06F 16/9032* (2019.01)

(52) U.S. Cl.
CPC ....... *B60W 50/10* (2013.01); *G06F 16/90332* (2019.01); *G10L 15/22* (2013.01)

(58) Field of Classification Search
CPC .............................. B60W 50/10; G10L 15/22
USPC ................ 704/231, 246, 247, 251, 252, 275
See application file for complete search history.

(56) References Cited

U.S. PATENT DOCUMENTS

| 2002/0070852 | A1* | 6/2002 | Trauner | B60R 16/0373 |
| | | | | 340/438 |
| 2011/0173002 | A1* | 7/2011 | Fujii | G10L 15/26 |
| | | | | 704/246 |
| 2013/0131893 | A1* | 5/2013 | Nakao | G07C 5/085 |
| | | | | 701/1 |
| 2015/0191122 | A1* | 7/2015 | Roy | G08G 1/096827 |
| | | | | 340/439 |
| 2016/0311323 | A1* | 10/2016 | Lee | B60K 35/00 |
| 2017/0334457 | A1* | 11/2017 | Park | G06F 16/245 |
| 2018/0024725 | A1* | 1/2018 | Penilla | G07C 5/008 |
| | | | | 701/49 |
| 2018/0059913 | A1* | 3/2018 | Penilla | H04L 63/083 |

OTHER PUBLICATIONS

Dillon, A. (2003) User Interface Design. MacMillan Encyclopedia of Cognitive Science, vol. 4, London: MacMillan, 453-458.

* cited by examiner

*Primary Examiner* — Leonard Saint Cyr
(74) *Attorney, Agent, or Firm* — Knobbe Martens Olson & Bear, LLP

(57) ABSTRACT

Generally described, the present disclosure relates to the efficient management and compact presentation of data or content with respect to a vehicle. For example, an operator of a vehicle may desire content related to vehicle operation, including, among many other forms of data, user manual information, warranty information, parts data, maintenance logs, etc. The disclosed techniques can use query inputs to optimize data presentation and provide augmented data to a user via an interactive user interface.

20 Claims, 10 Drawing Sheets

— Search Results —

HEPA Filter Replacement Interval — 372

On average, your HEPA filter should be replaced every six months, however, other users in your geographical area are replacing their HEPA filters more frequently, due to an increase in airborne pollutants. For more information, select any of the links below.

See also: — 374
HEPA Filter Current State of Health (SOH)
How Will I Know When to Replace the HEPA Filter
In-Cabin Air Quality Sensor Function
HEPA Filter Replacement Procedure (In-Vehicle)
HEPA Filter Illustrated Replacement Procedure (Mobile App)
HEPA Filter Automatic Re-ordering Settings

Related Content: — 376
To better understand HEPA filter performance at different times of the year, watch the video below.

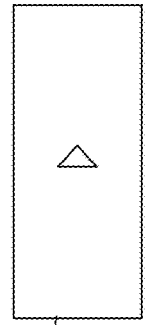

377

Related Queries: — 378
How Will I Know When to Replace the HEPA Filter?

The HEPA Filter Replacement icon will appear on the screen

ON-BOARD VEHICLE QUERY SYSTEM

TECHNICAL FIELD

The systems and methods disclosed herein are directed to vehicle user interfaces, and, more particularly, to an interactive user interface that provides query access for vehicle control and operational information.

BACKGROUND

Vehicles, such as cars, boats, tractors, and planes, include a wide variety of control mechanisms designed for an operator to control and operate a vehicle. For example, an operator of the vehicle can manipulate the internal air temperature or radio volume of a car through an interface, oftentimes located within reach of the operator or passenger for easy access. The operator or passenger may also manipulate the positioning of seats, external and internal lighting, windshield wipers, or engine gears, usually through manual operation of the relevant control mechanism. In addition, the vehicle operator may maintain or troubleshoot vehicle system health periodically throughout the lifetime of the vehicle. In doing so, the vehicle operator may consult a variety of material, such as a user manual or other material related to the vehicle operation and maintenance.

SUMMARY

The systems and methods for the interactive controls and query access techniques disclosed herein have several features, no single one of which is solely responsible for its desirable attributes. Without limiting the scope as expressed by the claims that follow, certain features of the user interface system will now be discussed briefly. One skilled in the art will understand how the features of the disclosed technology provide several advantages over traditional systems and methods.

One embodiment relates to a system for accessing content for a vehicle, the system comprising a database storing vehicle operational content formatted as a plurality of segmented portions each associated with a set of contextual metadata, a computer-readable memory storing executable instructions, and a processor in communication with the computer-readable memory and programmed by the executable instructions to at least receive data representing a query spoken by a user, perform natural language processing on the data representing the query, determine that the query includes a request for a portion of the vehicle operational content based at least in part on a result of the natural language processing, identify a particular segmented portion of the plurality of segmented portions based at least in part on the set of contextual metadata of the particular segmented portion and the result of the natural language processing, generate a user interface for presenting the particular segmented portion on a display associated with the vehicle, determine a driving status of one or both of the vehicle and the user, and when the driving status indicates that it is safe for the user to view information on the display, cause output of the user interface on the display, or when the driving status indicates that it is not safe for the user to view information on the display, store data representing the user interface for later output on the display.

In one aspect, the processor is further configured to store a version of the particular segmented portion corresponding to a version of a user manual of the vehicle that is available at a time of storing the version, receive, over at least one network, an update to the particular segmented portion, and generate the user interface to reflect the update to the particular segmented portion.

In yet another aspect, the processor is further configured to determine the driving status is in motion in response to determining that the vehicle is in motion above a predetermined threshold, and wherein the in-motion driving status indicates that it is not safe for the user to view information on the display.

In another aspect, the processor is further configured to determine whether the query originates from an operator of the vehicle, and in response to determining the query originates from the operator, cause output of an audible reading of the particular segmented portion through a speaker.

In yet another aspect, the display is in a field of view of an operator of the vehicle.

In another aspect, the processor is further configured to determine a set of vehicle controls relevant to the query, and generate the user interface to include navigational links to the vehicle controls.

In yet another aspect, the processor is further configured to generate the user interface to include an animation of instructions included with the set of vehicle controls to animate the relevant set of vehicle controls.

In another aspect, the processor is further configured to receive contextual content from at least one remote data source to augment the particular segmented portion; and present the contextual content as part of the user interface.

Another embodiment relates to a computer-implemented method, comprising receiving data representing a query spoken by a user, performing natural language processing on the data representing the query, determining that the query includes a request for a portion of the vehicle operational content based at least in part on a result of the natural language processing, identifying a particular segmented portion of the plurality of segmented portions based at least in part on the set of contextual metadata of the particular segmented portion and the result of the natural language processing, generating a user interface for presenting the particular segmented portion on a display associated with the vehicle, determining a driving status of one or both of the vehicle and the user, and when the driving status indicates that it is safe for the user to view information on the display, cause output of the user interface on the display, or when the driving status indicates that it is not safe for the user to view information on the display, store data representing the user interface for later output on the display.

One aspect further comprises storing a version of the particular segmented portion corresponding to a version of a user manual of the vehicle that is available at a time of storing the version, receiving, over at least one network, an update to the particular segmented portion, and generating the user interface to reflect the update to the particular segmented portion.

Another aspect further comprises determining that the driving status is in motion in response to determining that the vehicle is in motion above a predetermined threshold, wherein the in-motion driving status indicates that it is not safe for the user to view information on the.

Yet another aspect further comprises determining whether the query originates from an operator of the vehicle, and in response to determining the query originates from the operator, causing output of an audible reading of the particular segmented portion through a speaker.

In one aspect the display is in a field of view of an operator of the vehicle.

Yet another aspect further comprises determining a set of vehicle controls relevant to the query, and generating the user interface to include navigational links to the vehicle controls.

Another aspect further comprises generating the user interface to include an animation of instructions included with the set of vehicle controls to animate the relevant set of vehicle controls.

Yet another aspect further comprises receiving contextual content from at least one remote data source to augment the particular segmented portion, and presenting the contextual content as part of the user interface.

Yet another embodiment relates to a non-transitory, computer-readable medium having stored thereon computer-executable software instructions configured to cause a processor of a computing device to perform operations comprising receiving data representing a query spoken by a user, performing natural language processing on the data representing the query, determining that the query includes a request for a portion of the vehicle operational content based at least in part on a result of the natural language processing, identifying a particular segmented portion of the plurality of segmented portions based at least in part on the set of contextual metadata of the particular segmented portion and the result of the natural language processing, generating a user interface for presenting the particular segmented portion on a display associated with the vehicle, determining a driving status of one or both of the vehicle and the user, and when the driving status indicates that it is safe for the user to view information on the display, cause output of the user interface on the display, or when the driving status indicates that it is not safe for the user to view information on the display, store data representing the user interface for later output on the display.

In one aspect, determining the driving status of the user comprises determining an origination point for the query.

In another aspect, the vehicle content comprises a plurality of interactive content segments, including the first segmented portion, and wherein the plurality of interactive content segments comprises discretely packaged information.

In yet another aspect the operations further comprise receiving contextual content from at least one remote data source to augment the particular segmented portion; and presenting the contextual content as part of the user interface.

BRIEF DESCRIPTION OF THE DRAWINGS

FIGS. 3B-3F illustrates a sample user interface that may be implemented in conjunction with the connected vehicle of FIG. 1 or 2, according to various embodiments of the present disclosure.

DETAILED DESCRIPTION

Figure 1:
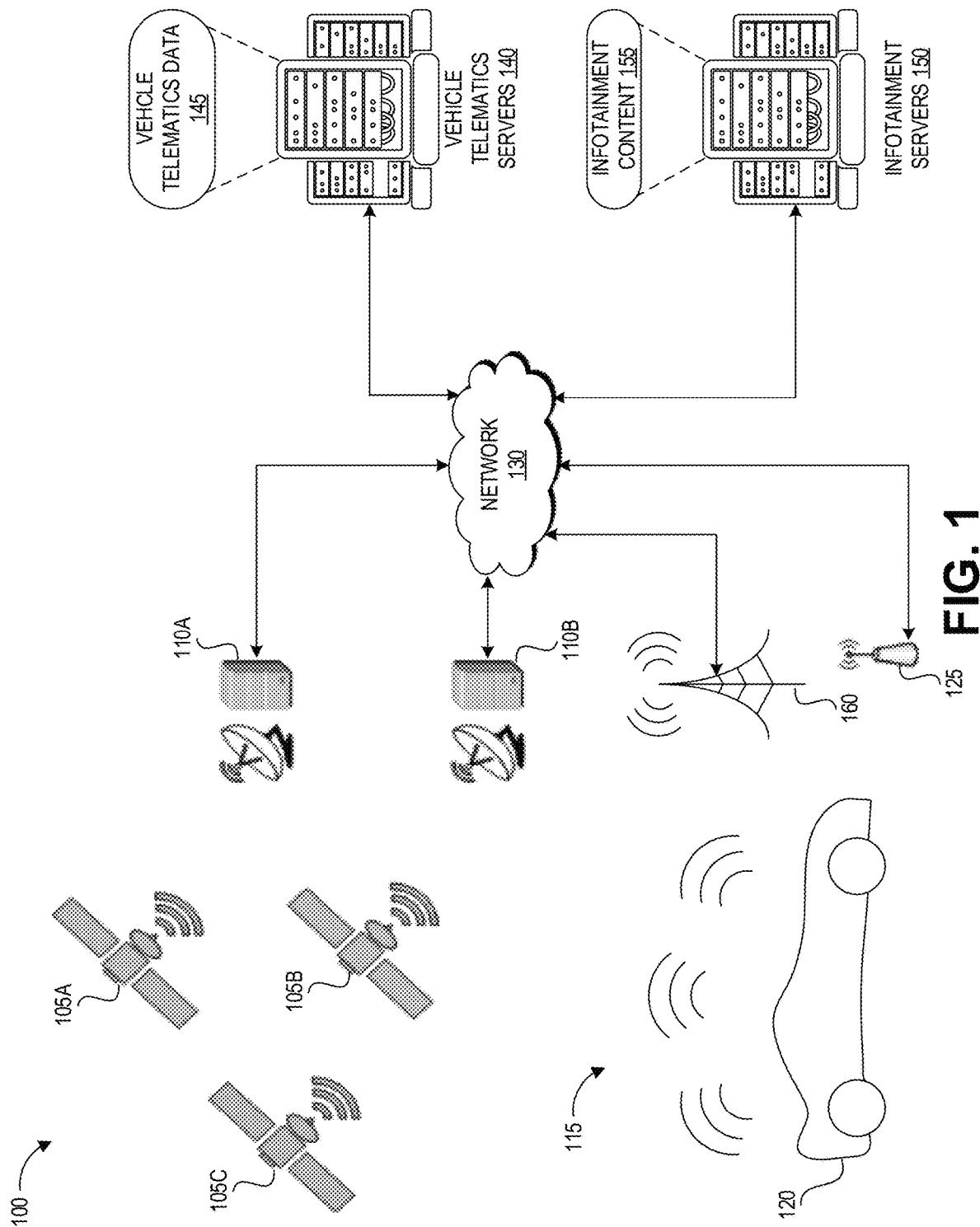
FIG. 1 depicts a schematic diagram of a networked connected vehicle communication environment in which various embodiments according to the present disclosure can be implemented.

Generally described, the present disclosure relates to an artificial intelligence (AI) engine for processing queries and dynamically determining when and how to display resulting content, for example to avoid distracting a driver. A connected vehicle can have many controls, parts, customization tools, or other features that a user can leverage in order to fully utilize the vehicle to its full potential. However, most of these features remain underutilized or unknown to a user due to the large number of features available and the lack of accessibility to information regarding these features to a user. As such, it becomes difficult for a user of a vehicle to quickly learn and understand how best to utilize all the different features of a connected vehicle or how to access this information quickly in real time or near time when the information is desired. In addition, the user may require additional information than is available in a standard user manual, or the user manual that comes with the vehicle may be out dated by the time the user requires the relevant information. In most instances, when encountering a problem with the vehicle or when requiring prompt assistance for customizing or changing operation of the vehicle, a user of a vehicle (e.g., an operator, driver, passenger, owner, etc.) may require the information immediately upon identifying the need. However, the user may be not be able to access the information while operating the vehicle and may not be able to synthesize the information quickly enough, such that the user may take action based on the information in the short time necessary. Further, a user could endanger themselves or a vehicular system, such as the engine control system, by not understanding the systems within the vehicle or knowing how to quickly access information in a manner that is not distracting to the user. Further, any static information obtained through a standard user manual, for example, may not necessarily relate to the user's specific problem based on the context in which the problem arose.

The aforementioned problems, among others, are addressed in some embodiments by the disclosed AI engine for providing access to content in response to a user query. Specifically, the AI engine can use semantic search techniques and contextual metadata to provide a highly accurate method for querying the content within the on-board user guide, installed in the vehicle's storage device. Some embodiments can augment the accessed user guide content with relevant external content (e.g., from data sources outside the vehicle) based on the context of the user query, to provide a higher degree of relevance to the response. The amount and type of information displayed can depend on whether the vehicle is moving or not, whether the vehicle is being autonomously driven, and which passenger is making the query. The AI engine can manage provision of query results in a way that can be minimally distracting to an active driver. For example, if a user is driving, the AI engine may respond and say that it will provide the information to the driver at a later time (e.g., when the car is parked).

Certain types of information related to vehicle operation ("vehicle content information") may be stored on-board a vehicle in a memory storage device. In some embodiments, some or all of this information may be stored on a data server accessible from the vehicle through a data network (i.e., wired or wireless). The vehicle content information may contain all vehicle system related information, including documentation, warranty information, user guides, emergency or maintenance contact information, maintenance logs, vehicle performance data, Global Positioning System (GPS) logs, diagnostic details, vehicle customization details, etc.

The vehicle content information may be segmented and configured for optimal presentation on a display device, such that the segments may collectively represent a significant portion of the vehicle system's available content. As used herein, a content segment generally refers to a discrete portion of information (e.g., portions of information that are topically related) packaged in a standalone form. A content segment can include, for example, one or more of textual information, graphical information, videos, and audio content. A content segment may be an interactive design pattern, such as a card component or formatted graphical unit. In some instances, a content segment may be configured to be displayed on a display device without requiring a user to manipulate the segment in order to fully access the entirety of the discrete portion. In other instances, a content segment may require some manipulation of the segment itself in order to fully access the entire discrete portion (e.g., a gesture control, scrolling, etc.). In addition, a content segment may be responsive to user interaction. For example, selecting aspects of a content segment may cause more data to be shown. In a non-limiting example, the entire content segment may be programmed to be selectable, as well as individual aspects of the content segment, such that selecting certain portions of a content segment may cause the occurrence of one response, whereas selecting another portion of the content segment may cause a different response. The content segments may be bound together in a contextual relationship, for example, by coding each content segment with context-rich metadata. In some embodiments, a link may be included to additional information stored in other memory storage devices (e.g., how-to-videos, weather forecasts, etc.). Additionally, embedded links may be included within a content segment that when activated, call another application. For example, selection of an embedded link may cause the presentation of an electronic control interface that allows a user to control a feature of the vehicle via the electronic control interface (e.g., activating window controls, climate controls, etc.).

A user may provide a query through use of a search keyword entered into a search field or as an audible query using a microphone. For example, the microphone of the vehicle may be initiated by a touch input or button, or may be configured to monitor for voice commands during certain conditions (e.g., when a passenger is sensed in the vehicle, when the vehicle is on or driving). Initiation of the microphone or another query input device may activate the query system. Once activated, the query system may receive a query from a user. A user may deactivate or cancel the query system. An icon or animation may be displayed indicating that the query system is activated and in listening mode or otherwise in thinking mode when processing a query.

Upon processing the query, relevant content segments may be identified from various sources. The relevant content segments may be identified based on semantic search techniques and the context-rich metadata associated with each segment. In some embodiments, the relevant content segments may be augmented by the query system. For example, the query system may be able to perform compound or hybrid searches using sources of content stored outside of the vehicle (e.g., a cloud network, utility company information, government and state agencies (e.g., environmental protection agency), etc.) to provide a higher degree of relevance and complexity to the response. For example, the additional content and/or data may be obtained via an API call to a content server or database or obtained directly from the vehicle (e.g., a vehicle sensor). The content segments may be prioritized based on, for example, degree of relevancy, and arranged for presentation on a user display (e.g., mobile device, vehicle display device, etc.).

The results of the query, including the relevant content segments and/or the augmented content, may be arranged to fit on a screen and presented on the display screen. For example, the size of a target display screen may be determined and the relevant content segments selected and arranged based on the total available size of the screen. Alternatively, a portion of the content may be displayed on the screen while other information may be conveyed audibly. In some embodiments, a user may be able to scroll up or down on the screen such that the size of the screen does not restrain the amount of information that may be presented for display.

The amount and type of information displayed can depend on the status of a vehicle or whether the query is determined to be coming from an operator (e.g., driver, pilot, captain, etc.), rather than a passenger, of the vehicle. For example, if the vehicle is in motion at speeds greater than a predetermined threshold speed and a query is received from a system associated with an operator of the vehicle, the query system may suppress the visual display of information on the display device associated with the operator or delay the visual display until the speed decreases. Additionally, if the vehicle is in motion the query system may provide the results of the query as an audible output through a speaker system, or may indicate that the system will provide the requested information at a later time (e.g., when the car is parked, is traveling at a low enough speed or accelerating/decelerating at an low enough rate). In some embodiments, the system may able to differentiate between an operator and a passenger based on where initiation or submission of the query originates within the vehicle. For example, a query may be initiated based on the pressing of a button located on the vehicle's steering wheel. Because the query is initiated from the steering wheel, the system may determine that an operator is making the query. The system may determine that the results of the query should be displayed on a display device located in proximity to the operator (e.g., within the visible field of view of the operator) or on a display otherwise known to the system as being associated with the operator (e.g., the operator's mobile device). In some instances, specific display devices within a vehicle may be flagged as being associated with an operator, whereas others may be flagged as being associated with a passenger. For example, a display device located on the passenger door panel may be preprogrammed as a display device associated with a passenger because in normal operational use, the display would be used by a passenger. Additionally, each display device or each vehicle compartment may have dedicated query activation capabilities, such that activation from each device would register as a query associated with the originating device. In some embodiments, the query system may display results on a display device associated with a passenger of the vehicle or on a mobile device of the passenger. In some instances, a mobile device may be docked in a vehicle in which case the displayed content may be on the mobile device until the mobile device is undocked from the vehicle or may remain presented on the mobile device indefinitely. In addition, results of a query may be presented differently depending on the specific display device targeted for display. For example, the system may determine that the results are slated for display in a rear-display (e.g., associated with a passenger) and as such, may present additional content that would otherwise, be omitted from display for an operator (e.g., a video or other media streaming that may be distracting to an operator but perfectly safe for a passenger display).

In some embodiments, the query system may determine, through semantic processing, that the query includes a request for an action (e.g., "how do I adjust the position of my seat?"), rather than a request solely for information (e.g., "where do I adjust the position of my seat?"). The query system may determine the relevant content segments from the internal or external databases, but may also identify the relevant controls for implementing the action requested (e.g., seat adjustment controls). The query system may present the relevant controls in a user interface by themselves or in conjunction with the content segments determined to describe the process for implementing the action. In some embodiments, an animation may also be provided for such queries guiding a user on how to implement the action. In a non-limiting example, an indicator (e.g., light, series of lights, arrows, haptic feedback, sounds, etc.) may be activated guiding the user to the relevant controls with audible instructions on how to understand such indicators. This information may be stored in connection with the control system, the query system, or both as a linked data structure.

As would be appreciated by one of skill in the art, the dynamic display of vehicle information content responsive to user queries, as disclosed herein, represents a significant technological advance over prior implementations. Specifically, the disclosed techniques can identify and display a limited set of vehicle-related content segments and augmented content, resulting in an increased efficiency in accessing the relevant content quickly and allowing user interactions with multiple content segments. Further, the disclosed techniques can yield safety benefits by dynamically determining how and when to display query results, for example allowing the user to choose to interact with the content segment at a point in time when the query system deems safe. A user may also be presented with the relevant vehicle control mechanisms based on their query, along with the related content segment describing those controls based on, for example, an embedded link between the content segment and relevant controls. As such, the embodiments described herein represent significant improvements in this computer-related technology.

Additional embodiments disclosed herein also represent improvements in computer-related technology. For example, the vehicle system may receive over-the-air (OTA) updates to keep content stored in the vehicle current. In addition, content may be queried using a digital assistant and the results of the query may be displayed in a user-friendly interactive user interface and/or read aloud to avoid distracting a driver. Additionally, the vehicle system applications employed herein may, in some embodiments, be native to other software applications, and thus, the content segments may be displayed using similar UI/UX elements. Other example improvements include the ability to call external sources of information to provide a greater relevance and complexity to a response and in some embodiments, the ability to call APIs (e.g., language translation APIs) to perform additional work within the system.

The ideas disclosed herein exist within the realm of computer-related technology. For example, the display of information in an interactive user interface where the relevant data does not necessarily reside in a storage device locally coupled to the relevant display device would be virtually impossible to replicate outside the realm of computer-related technology. In a non-limiting example, the multi-faceted information (e.g., static content segments, dynamically augmented content segments, etc.) are simultaneously or dynamically obtained from disparate systems, identified by metadata in some instances, and simultaneously or dynamically presented in an interactive user interface. This multi-faceted information is presented in response to a user query, where a user may seamlessly navigate to additional content via the interactive user interface. Additionally, the vehicle system may intuitively present the data on the proper display, through the proper medium, and/or at the proper moment.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458). The various embodiments of interactive and dynamic user interfaces of the present disclosure are the result of significant research, development, improvement, iteration, and testing and in some embodiments, provide a particular manner of summarizing and presenting information in electronic devices. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized presentation of vehicle-specific information from various sources and may enable a user to more quickly access, navigate, assess, and utilize such information than with previous systems which can be slow, complex and/or difficult to learn, particularly to novice users. For example, users would face the problem of having to search through a user manual in order to receive useful data for optimally using the vehicle and then access a separate system to receive related content, all costing time and valuable processing resources due to the extensive amount of time required. In addition, the content segments would not be presented in a user interface tied to relevant controls or other related content segments. Presentation of concise and compact information on a particular user interface associated with the querying party makes for efficient use of the information available and optimal use of the vehicle having current information available from any number of data sources.

In addition, the task of navigating a large catalog of vehicle information (e.g., a user manual, a parts list, a warranty packet, etc.) or other item information database to locate relevant content can be burdensome and time consuming for users, especially if the users do not know precisely what content they are searching for (e.g., not knowing the name of a particular part or how to describe a sound made by a vehicle). Typically, the user can locate a relevant page by manually flipping through a physical vehicle manual, or by navigating a browse structure or table of contents of an electronic vehicle manual in which the items are arranged by category and subcategory. Typically, however, the table of contents includes several levels of categories, requiring the user to navigate through several levels or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest.

In accordance with the present disclosure, users are allowed to more easily see, access and/or specify the most relevant data with respect to vehicle information. Further, the interactive and dynamic user interfaces described herein are enabled by innovations in efficient interactions between the user interfaces and underlying systems and components. For example, disclosed herein are improved methods of receiving user inputs, extracting useful information from the user input, correlating such information across various different data structures, delivering the information to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, although described in the context of a connected vehicle, the disclosed data transfer optimization techniques can be implemented in other mobile networked computing environments.

Overview of Example Networked Connected Vehicle and Environment

FIG. 1 depicts a schematic diagram of a networked connected vehicle communication environment 100 in which various embodiments according to the present disclosure can be implemented. FIG. 1 depicts a connected vehicle 120, which may be a car (as illustrated) or a truck, van, aerial vehicle, boat, train, or other motive vehicle. The vehicle 120 may be an electric vehicle in some implementations, or may be a hybrid vehicle, hydrogen vehicle, or combustion vehicle.

The vehicle 120 can be configured to establish a number of different types of wireless network connections, including satellite connections and WiFi connections. For example, the vehicle 120 can be equipped to connect to geosynchronous satellites 105A, low-earth orbit satellites 105B, global navigation satellite systems 105C, cellular base station transceivers 160 (e.g., for 3G, 4G, LTE, and/or 5G cellular network access), and WiFi access points 125, as they are available. In turn, the geosynchronous satellites 105A and low-earth orbit satellites 105B can communicate with gateways 110A, 110B that provide access to the network 130. The cellular base station transceivers 160 can have connections that provide access to the network 130. The global navigation satellite systems 105C can communicate directly with the vehicle 120, for example to triangulate (or otherwise compute) its location. These various satellite, cellular, and WiFi network connections can be managed by different third-party entities, referred to herein as "carriers."

The vehicle 120 can use these various connections to communicate over network 130 with remote computing resources such as the vehicle telematics servers 140 and infotainment servers 150. The network 130 can include any appropriate network, including a private network, personal area network, an intranet, local area network, wide area network, cable network, satellite network, cellular network, peer-to-peer network, cloud network, etc. or a combination thereof, some or all of which may or may not have access to and/or from the Internet. The data network may be implemented by data servers. In some embodiments, data servers may be implemented on one or more host devices, such as blade servers, midrange computing devices, mainframe computers, desktop computers, or any other computing device configured to provide computing services and resources. In the illustrated embodiment, the network 130 is the Internet. Protocols and components for communicating via the Internet or any of the other aforementioned types of communication networks are known to those skilled in the art of computer communications and thus, need not be described in more detail herein.

The vehicle telematics servers 140 can store and analyze vehicle telematics data 145, for example diagnostic data received from the vehicle 120 and other vehicles. In some implementations, the vehicle telematics servers 140 can be maintained and securely stored by the entity that monitors vehicles for diagnostic, troubleshooting, and maintenance purposes. Beneficially, analysis of the vehicle telematics data 145 can enable this entity to provide improved vehicle service, vehicle software and/or firmware upgrades, and aid in further content display. Accordingly, this entity can desire for certain telematics data to be provided from the vehicle 120 to the vehicle telematics servers 140, perform telematics analysis on the data, and relay results from that analysis back to the vehicle for integrating the data with other displayed content.

The infotainment servers 150 can store infotainment content 155, for example media that provides a combination of information and entertainment. This media can include, for example, music, movies, podcasts, news, and other broadcast material that may be of interest to vehicle users. This content can be provided on demand to users of the vehicle 120. This data may be provided at predefined intervals (e.g., sending predicted interesting news articles), or may be delivered in real-time (e.g., on demand as requested by a user). In some implementations, data stored on one or more of these servers may be used to augment the requested on-demand data, supplement the data, replace or modify the data stored in a storage device internal to the vehicle, or otherwise be displayed on a vehicle display device in connection with a content query as further discussed below.

Figure 2:
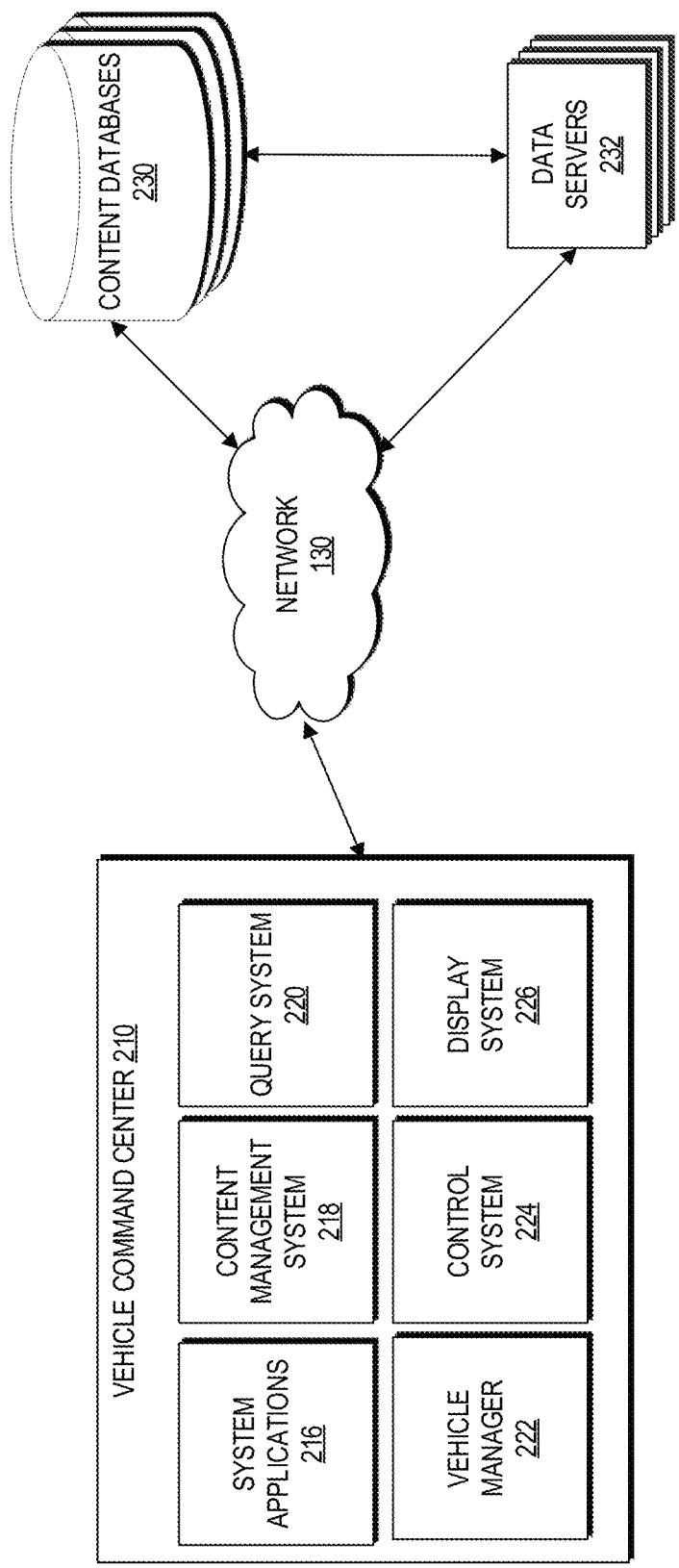
FIG. 2 depicts example systems, components, and applications of the connected vehicle of FIG. 1 in a sample network environment.

FIG. 2 depicts a block diagram of example system and application components of the connected vehicle 120. In the illustrated embodiment, the vehicle command center 210 may reside in a central storage unit of the vehicle with a processing unit and computing components (e.g., modem units) that enable the vehicle 120 to connect to the network 130, for example via the satellites 105A, 105B and/or WiFi access point 125 of FIG. 1. In addition, the command center 210 may include a number of system applications 216, a query system 220, a vehicle manager 222, control system 224, display system 226, and content management system 226. For example, system applications 216 can include user applications, vehicle applications, infotainment applications, such as media streaming, real time traffic visualization, network browsing, etc.

In some embodiments, content management system 218 manages, stores and provides access to content stored on-board the vehicle or through network 130 from an external content database 230. The content stored in either case may be embedded with context-rich metadata. For example, the context-rich metadata may be expressed in plain text, Hypertext Markup Language (HTML), XML, Resource Description Framework (RDF), or any other form as will be understood by the skilled person. In some embodiments, context-rich metadata comprises metadata that incorporates a multitude of different ways to invoke a particular content segment and is included in the content segment as part of its structured data. Accordingly, context-rich metadata comprises data elements (e.g., tags, links, keywords, fuzzy keywords, dynamically generated elements, context, etc.), that are configured to identify, alone or in combination with other elements, a content segment to display, for example, based on the possible interactions that an end user may have with the vehicle system. In some embodiments, the data elements may be weighted or scored, where the weight for an individual metadata element may be dynamically updated based on a user interaction (e.g., using a ML model), so that the metadata may take on a texturized form. The content may include information specific to the vehicle as described above and may be partitioned into individual content segments that may be called individually based on a query. In some embodiments, only a portion of the total content may be formatted as content segments. For example, only the content that is frequently queried over time may be formed as a content segment, such that not all vehicle information relevant to the vehicle need be segmented. The format of each content segment may include a size and shape for the content, such that the format is aesthetically pleasing and available to a user when viewing the content segment on a display device, such as those content segments shown as an example in FIG. 3D. Furthermore, each content segment may include its own context-rich metadata that represents the segment itself and may also include links to other relevant content segments that, depending on the contents and context of a query, may also be identified for display on the display device in addition to presenting the primary content segment, as in FIG. 3D.

In some embodiments, a database included with a vehicle or external to the vehicle may be or include a key-value data store, such as an object-based database or dictionary. In a non-limiting example, a database may include any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, extensible markup language (XML) files, TeXT (TXT) files, flat files, spreadsheet files, and/or any other widely used or proprietary format for data storage. For example, the content segments may be laid out as individual, structured XML segments. Databases are typically stored in one or more data stores. Accordingly, each database referred to herein (e.g., in the description herein and/or the figures of the present application) is to be understood as being stored in one or more data stores. In various embodiments, outgoing requests and/or incoming responses may be communicated in any suitable formats. For example, XML, JSON, and/or any other suitable formats may be used for API requests and responses or otherwise. As described herein, data transfer refers to both transmitting data from a connected vehicle over a network and receiving data at the connected vehicle over a network. The data may be in various formats, such as a database format, files, XML, HTML, RDF, JSON, a file format that is proprietary to the system, data object format, or any other format, and may be encrypted or have data of any available type.

In some embodiments, content management system 218 may receive content from network 130 with instructions to replace or modify content stored within the vehicle. For example, a content segment may need to be replaced with a new content segment or tagged with new metadata as instructed from the network. The content managed by content management system 218 may be accessed via query system 220 or through an intermediary such as vehicle manager 222. The content management system 218 may also include links within individual content segments that route to other content segments when selected or links to relevant control mechanisms that may be presented as part of display system 226 upon request from a user or automatically based on the content or context of the query.

In some embodiments, the query system 220 is an AI engine capable of receiving and processing a query, and determining how to deliver the results, in accordance with certain embodiments described herein. For example, a user of the vehicle (e.g., operator, passenger) may press a button located within the vehicle (e.g., on the steering wheel, dashboard, etc.), select and hold the button for the full or partial duration of the query, enter a keystroke, select a soft key on a touch enabled display that is wired to the vehicle or otherwise wirelessly connected to the vehicle, and/or provide a preconfigured voice initialization command, to signal to the vehicle that the user desires to initiate the query system 220. In some embodiments, query system 220 may also identify and track from whence the query command originates (e.g., a physical section of the vehicle associated with the operator, a passenger section). The query system 220 may also recognize through facial or voice recognition, and thereby track, which user of the vehicle submitted a query. A history of queries may be stored in memory for future predictive modeling or behavior tracking and analysis, so that future queries may be met with enhanced or refined responses.

Upon initialization, the query system may enter a listening mode where input is received through one or more microphones. While input is being received or once query system detects that the query is complete, query system 220 may enter a thinking mode where deconstruction of the input query is performed using any number of various natural language processing techniques, along with various signal processing and filtering techniques, known in the art. For example, the query system may process a query using a semantic search technique (e.g., natural language processing, machine learning algorithms, fuzzy logic, keyword to concept mapping, etc.). A person of skill in the art would understand how, for example, keywords or fuzzy keywords may be identified within a text or audible query for further processing. Additionally, some implementations of query system 220 may use predictive logic to determine the contents or context of a query. Some implementations can use a trained deep learning algorithm to, for example, predict the contents or context of the query.

The context of the query may in some instances correspond to a circumstance of the vehicle or user. For example, based on geographic location or GPS information, the context in which the query was presented may be inferred and the response augmented based on the context. In a non-limiting example, a user may desire information on reading an UV index presented within the vehicle. The vehicle may present a descriptive content segment for understanding the presented information and may further augment, based on GPS data for example, the description by providing UV information for the user's expected destination. In some embodiments, the richness of this augmented interaction may depend on the number of API connected services that are available to a vehicle. Additionally, this type of augmented interaction may depend on the context-rich metadata included with a particular content segment, identified as additional information to display relative to an identified vehicle component or control mechanism associated with the query. For example, if the query is about interior air quality, the query system may identify that the relevant component (e.g., based on metadata, natural language processing, etc.) corresponds to an indoor air quality sensor. Accordingly, the possible sources of augmented content could be, for example, an outside air quality sensor, a cloud-connected weather forecast service, and/or an Environmental Protection Agency (EPA) or Air Resources Board (ARB) website with local information on historical or actual pollution patterns in the general geographical area. As such, this data may be integrated into a relevant content segment or delivered in association with a relevant content segment as one or more separate content segments.

Query system 220 may also be configured to differentiate between a query for initiating an action within the vehicle, as opposed to one requesting descriptive information regarding a feature of the vehicle. For example, user queries that query system 220 determines to involve location of a feature (e.g., "Where do I adjust," "Show me the controls," etc.) may trigger retrieval and presentation of the relevant control mechanism associated with the query. In a non-limiting example, the descriptive content segment ordinarily associated with such a query may not be fetched in response to such a query because the query is based on the location of a feature and not based on how to perform a function (e.g., "how do I control," "show me how to adjust the seat," etc.). Differentiation between types of queries may further be accomplished based on keyword detection and semantic analysis, for example.

In some embodiments, certain types of queries or certain queries themselves may be configured to display a descriptive content and the relevant controls. Alternatively, query system 220 may generate and provide a link (e.g., a floating icon, hyperlinked text, etc.) configured to call the relevant controls or the relevant descriptive content when query system 220 only provides one or the other in response to a query. A user presented with descriptive content segments, for example, may then select a floating icon or hyperlinked text and be presented with new content, such as a control screen determined relevant, but not pertinent to the user query, based on an initial or subsequent analysis of the query. For example, query system 220 may perform a subsequent analysis of the query based on a user selecting a generic floating control systems icon (e.g., picture of a wrench, etc.) or may provide an individually tailored icon based on the initial analysis and processing of the query. By waiting to perform a subsequent analysis, the efficiency of the computer system may be improved, since a user will not always queue the controls through selection of the generic control systems icon. Likewise, a relevant control system interface may be presented in response to a query, based on specific rules as described herein, with a fixed or floating icon for descriptive content via a content segment. Similarly, a user may select the icon or text via the interactive user interface and be rerouted to a page with only descriptive content segments. In some embodiments, the content segment or segments may be flashed momentarily (e.g., based on a preconfigured temporal signal, facial or eye recognition, a voice command indicating the control page may be returned, touch or swipe gesture, etc.), a subset or all of the relevant descriptive content segments may be presented, or a hybrid of content segments and control mechanisms may be displayed, as in some instances, would be done in the first instance, for example, when query system 220 deems this linked icon scheme unnecessary based on conditions of the content segments (e.g., metadata, keyword triggers, etc.), query system 220, and the control system configuration, but that both types of content should be displayed. A person skilled in the art would understand the various configurations that may be achieved with respect to the descriptions herein and thus, for sake of brevity not all combinations are explicitly described.

A trained ML model can be used to process and analyze the user query in accordance with certain embodiments of this disclosure where ML models are considered advantageous (e.g., predictive modeling, inference detection, contextual matching, natural language processing, etc.). Examples of ML models that may be used with aspects of this disclosure include classifiers and non-classification ML models, artificial neural networks ("NNs"), linear regression models, logistic regression models, decision trees, support vector machines ("SVM"), Naïve or a non-Naïve Bayes network, k-nearest neighbors ("KNN") models, k-means models, clustering models, random forest models, or any combination thereof. These models may be trained based on data indicating how users interact with query results. For example, certain aspects of the disclosure will be described using events or behaviors (such as clicking, viewing, or watching) with respect to items (e.g., vehicle parts, videos, weather indices, etc.), for purposes of illustration only. In a non-limiting example, a user may score the results of a user query which may be used to train an ML model for future queries. This helpful data may be shared across a vehicle network so that optimal results may be presented to more than one user based on similar queries and user reactions to those queries. For brevity, these aspects may not be described with respect to events or behaviors regarding objects (e.g., data objects, such as search strings).

Vehicle manager 222 can include software and firmware that manages and monitors vehicle systems, for example by performing diagnostics of various vehicle systems, maintaining vehicle software, and the like. Vehicle manager 222 may also manage interactions between the various systems and components of vehicle command center 210. For example, vehicle manager 222 may identify relevant control systems via control system 224 that pair with a query result processed via query system 220. Vehicle manager 222 may also provide relevant vehicle diagnostic data or sensor data to a system configured to generate or retrieve content (e.g., content segments), such as a content management system 226, for augmenting data presented with a content segment that may be determined relevant in response to a user query. For example, a user query may be "how do I read the air quality sensor?" In response to processing and deconstructing the audible or text-based query, the query system may identify a set of relevant content segments comprising vehicle information related to the air quality sensor. In addition, the content segment may be augmented or enhanced by providing actual data from the air quality sensors along with the relevant descriptive content segment (e.g., a content segment adapted or derived from the vehicle's user manual or other content source) or with information from an external source based on the context of the query (e.g., GPS location of the vehicle and air quality in a current or expected location). For example, identifying the set of relevant content segments may be based on a matching of aspects from the deconstructed query with the context-rich metadata embedded with each content segment. The content segments may also be identified through keyword searches in a search engine. A person skilled in the art would understand that various strategies exist for conducting query searches and that any one of those strategies may be implemented in keeping with the spirit of this disclosure.

In some embodiments, vehicle manager 222 may flash or install vehicle information on a vehicle storage device with information from a data network. Additionally, the content stored on the vehicle storage device may be updated, modified, or otherwise replaced with data from the data network. For example, a portion or segment of the user manual may be determined to be faulty or outdated and thus, may be replaced by a new version from the data network in a database stored internal or external to the vehicle but ultimately accessible to a user of the vehicle, as described herein.

In some instances, a set of control mechanisms related to customizing or otherwise manipulating the vehicle's control system may also be identified, additionally, optionally, or alternatively, in response to the user query, as further described herein. The control mechanisms may be identified based on the metadata stored with each content segment or based on metadata stored with the relevant controls themselves.

Continuing with the previous example, in addition to displaying the relevant content segment and/or relevant control mechanism related to reading and manipulating an air quality sensor, a content segment may also be created and formatted to include the actual real-time or historical data obtained from the vehicle via one or more of the air quality sensors. In some embodiments, the content segment may be preconfigured to include a predefined template for including the real-time data within the predefined template and preconfigured to serve as the basis for an audible read-out response to the query or a visual display of such data. In embodiments where a user query is, for example, "how do I replace my HEPA filter?," similar information may be provided as before, but additional information may be located and obtained through network 130, such as a tutorial video and/or a parts catalogue, to be presented alongside the vehicle information content segments. In some embodiments, vehicle manager 222 may receive the query from query system 220, determine that the query relates to information not necessarily stored internally to the vehicle, and thus, leverage a system application 216, such as a media streaming service, in order to locate supplemental content through network 130 in order to augment the ultimately displayed result. In such embodiments, a user may be presented with content segment comprising a list of stores nearby that carry the relevant part, a how-to video on replacing the part, warranty information on the part, a content segment on how to determine when the part needs to be replaced as described in the user manual, etc. When the content is voluminous, a scroll feature may be presented on the display device, so that a user may scroll through each content segment provided via interactive user interface. A user may also perform a gesture to remove certain content segments from presentation on the display device (e.g., swiping across the screen, swiping across a touch sensitive portion of the steering wheel, etc.). In some instances, performing a gesture on a content segment may cause the query system to load or present a preloaded second content segment that was not included with the resulting interactive user interface originally presented. A person skilled in the art would understand that other methods of cycling through content may be possible, such as through voice controls, eye movement, etc. that, for brevity, may not be explicitly described here.

In addition, control system 224 may comprise control mechanisms for controlling the vehicle. Control system 224 may also be configured to query a vehicle control unit, not shown, for data (e.g., raw analog or digital signals, signals produced by the control unit, etc.) that may be used for augmenting the control segments presented on display system 226. In addition, control system 224 may include the user interface controls for controlling certain aspects of the vehicle. For example, control system 224 may manage all input received from a user via a user interface and present relevant controls based on user input. In addition, control system 224 may coordinate with other systems of vehicle command center 210 to present the controls relevant to the user query based on the content and context of the query. For example, if a user query is determined to be a query for an action, such as "where do I adjust my steering wheel?," the control system 224 may provide the relevant controls for adjusting the steering wheel. Alternatively or additionally, control system 224 may provide an indicator on the display device, such as illuminating and/or animating the relevant control feature, or if adjusting the steering wheel is a mechanical function, illuminating the relevant mechanical feature or illuminating a vicinity of the relevant mechanical feature, so that a user may easily identify the mechanism for adjusting the steering wheel position based on the query. In a non-limiting example, a user query for opening a vehicle door may be met with a series of indicator lights within the vehicle pointing towards the car door opener. In addition, the relevant descriptive content segment may be presented with the relevant controls, which describe operation of the control mechanism in a single interactive content segment. Accordingly, a user may dismiss the descriptive content segment through a preconfigured gesture and the control mechanism may expand to fill the portion of the screen previously occupied by the descriptive content segment.

Display system 226 may comprise system software for generating user interface data based on the content segments to be presented and the display device that is the target of the content segments. The display device 200 may comprise a LCD, LED, OLED, QLED, 4K UHD, plasma, etc. monitor. The display device may be touch-enabled and configured to receive touch input from a user. Display system 226 may be further configured to designate a target display device within the vehicle or a mobile device associated with the vehicle. Display system 226 may receive input from the display devices notifying the display system 226 of the size and shape of the display device and may format the user interface data accordingly. In some instances, a scroll feature may be provided when the display screen is not sized accordingly to fit all relevant content. In such instances, a top portion of the user interface may be fixed in place such that it does not move when a user scrolls through the content. In addition, a cancel feature may also be included in the user interface, in the fixed portion or elsewhere. Alternatively, a user may cancel the query request or return to a previous page or control screen, using voice commands, touch input, etc.

A person skilled in the art will understand that one or more of these systems and components may be implemented separately from vehicle command center 210 or may be integrated with other applications and components within command center 210. For example, vehicle manager 222 may be integrated with control system 224 in some embodiments.

In addition, FIG. 2 depicts a number of content databases 230 that may be accessed directly from one or more components of vehicle command center 210 (e.g., content management system 218) through a wired or wireless network 130. Additionally, command signals may be relayed to data server 232, serving as an intermediary or primary system for accessing, processing, and/or relaying content from content databases 230 to or from vehicle command center 210 through network 130. A network data interface, not shown, may be included with vehicle command center 210 to manage the transfer between the system components, applications and network data. A person skill in the art would understand that each content database 230 may be part of a disparate system associated with a dedicated data server 232 or have a data server integrated therewith. Furthermore, these servers and databases may be managed or controlled by one or more separate entities (e.g., ISPs, content providers, etc.).

Figure 3A:
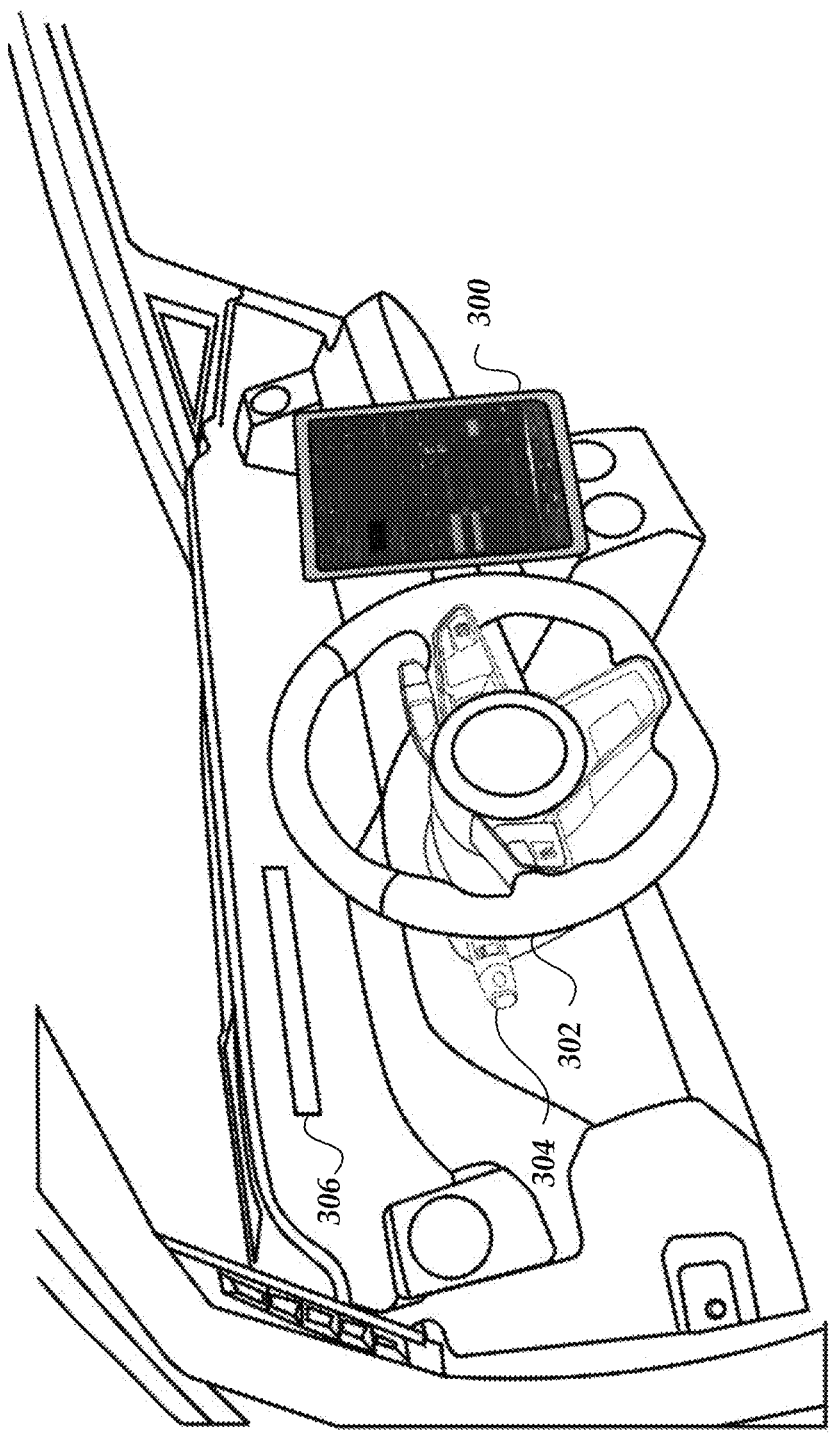
FIG. 3A depicts an example cabin of a vehicle, such as the connected vehicle of FIG. 1.

FIG. 3A depicts an example view of an inner cabin of a vehicle (e.g., operator compartment). In a non-limiting example, the inner cabin of a vehicle may include a variety of features and control mechanisms, such one or more display devices 300, a steering wheel 302, one or more operating units 304, and dashboard 306 are explicitly labeled. For example, in the example view of FIG. 3, the inner cabin of a vehicle may include a variety of features and control mechanisms, such as one or more operating units 304 located near the steering wheel 302, on either side of steering wheel 302, or located elsewhere away from steering wheel 302. For example, operating units 304 may include a turn signal operator, windshield wiper operator, cruise control operator, etc. In some embodiments, a display device 300 may be located in proximity to the operator of the vehicle, for example, as shown in FIG. 3. In addition, the vehicle may have multiple displays located throughout the vehicle. For example, other display devices, such as display device 300, may be additionally located on the dashboard 306, on a door, or in the rear passenger compartment of the vehicle, with similar functionality to that of display device 300. In some embodiments, each display device may come equipped with its own dedicated microphone and speaker system associated with the individual display device. These multiple microphones may be used to triangulate the location of a spoken query, and this triangulation can determine whether the vehicle operator or a passenger is requesting information. In other embodiments, the microphone or speaker system may be located proximal to a display device and yet configured to pair with an individual display device or one or more dedicated display devices.

In addition, each display device may be tracked, such that query system 320 knows which display device is associated with an operator and which is associated with a non-operator (e.g., passenger) of the vehicle. For example, a display device located in a portion of the vehicle associated with a passenger, such as in a front passenger seat, rear seat, or else otherwise located away from an operator, may be recognized as a device not associated with the operator and thus, when a query is recognized as coming from the non-operator device, the system may behave differently than if the query is recognized as coming from an operator device, as described.

A person skilled in the art would understand that the configuration of a vehicle may differ from that shown in FIG. 3 and that this is merely an example to illustrate certain embodiments of the disclosed technology. In addition, the operator compartment of other types of vehicles may be configured differently. For example, the operator compartment of an airplane, boat, farming vehicle, etc. may include different control mechanisms and display devices nonetheless configured to operate in accordance with the disclosed technology.

Figure 3B:
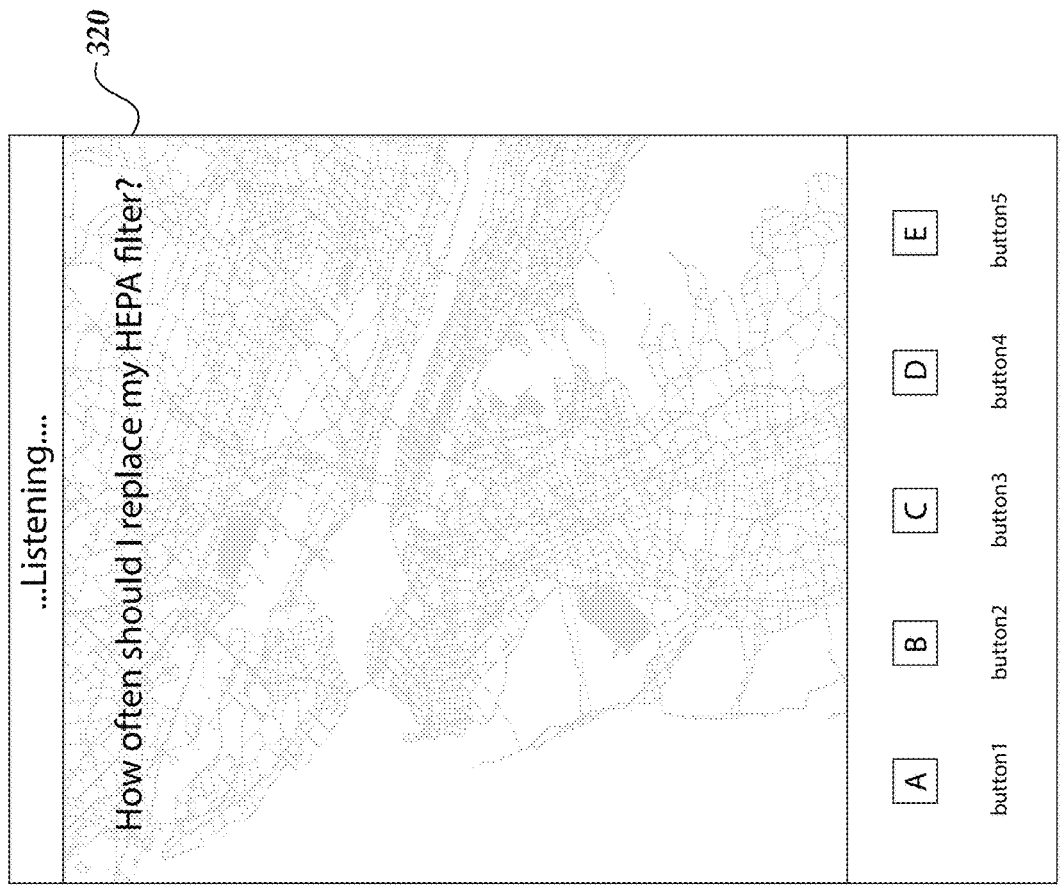

FIG. 3B depicts an example interactive user interface 320 configured to display on a display device, such as display device 300. In the example of FIG. 3B, the query system 220 has been initiated and has entered into listening mode. A person skilled in the art would understand that a user may be notified that a system is in listening mode in other ways, including animations, illuminating lights, audible indicators, or otherwise with a message on the screen, as shown. The user query in the example of FIG. 3B is "how often should I replace my HEPA filter?" As the user provides the query, query system 220 may process the query and present text on the screen as the query is being provided or once the query is complete. The interactive user interface 320 may include other content, such as default control features on the screen (e.g., music, climate control, etc.), not explicitly shown in FIG. 3B.

Figure 3C:
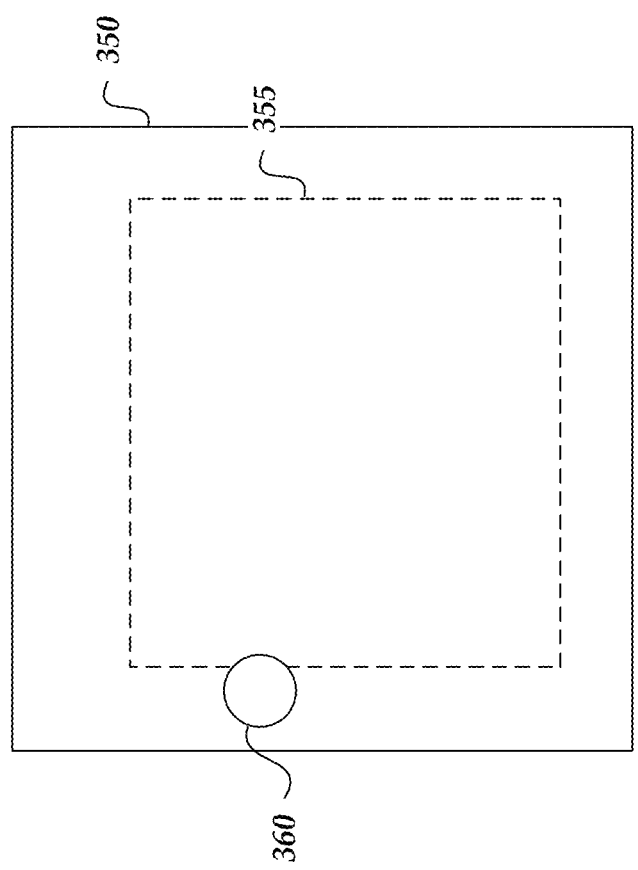

FIG. 3C depicts an example interactive user interface showing a control screen 350. This user interface may be presented on a display device in response to a user query. Alternatively, in response to a user query, a user may be presented with an option (not shown) to, for example, navigate to a control screen 350 comprising control features deemed relevant to the query, access content segments determined relevant to the user query, or access vehicle documentation (e.g., user manual, warranty manual) based on the query. In a non-limiting example, a user may select, via the interactive user interface, to navigate to control screen 350. Control screen 350 may include control features 355, such as a series of soft keys (e.g., knobs, buttons, switches, etc.) that are configured to control features of the vehicle. In a non-limiting example, the control screen 350 may present climate controls for adjusting the temperature including controls for increasing or decreasing the temperature, controls for adjusting fan speed, etc. The control features may be identified based on the results of the natural language processing. In some embodiments, varying degrees of control features may be presented on different display devices and may have varying degrees of control associated with said features. For example, a display device associated with an operator of the vehicle may have functionality to control all windows of the vehicle, whereas a display device associated with a passenger may only be presented with controls to control a respective window of the vehicle. These control privileges may be customizable by a person with appropriate customization privileges. For example, the owners or primary operators of a vehicle may be able to customize all privileges from a mobile device or from an interface located within the vehicle (e.g., based on access privileges bestowed on the owners at the time of purchase).

In addition, one or more icons 360 may be presented that, if selected, would route the user to one of the other options previously presented. The icon 360 may be a floating icon (e.g., moveable on the screen by a user) or fixed in place on the screen. Selecting icon 360 may be one of many ways a user may access content segments, similar to those shown in FIG. 3D.

FIG. 3D depicts an example interactive user interface 370. The example interactive user interface 370 may be displayed on a display device 300 as shown, in response to a user query (e.g., the user query of FIG. 3B). Interactive user interface 370 may include a plurality of content segments 372, 374, 376, 378 which represent example content segments identified by vehicle command center 210 based on metadata associated with content segments stored within a vehicle storage device or content identified external to the vehicle storage device, such as related links 374, related content 376, related queries 378, etc. In a non-limiting example, the primary content segment result 372 may be shown at the top of the screen. In some instances, a portion of the screen may be fixed, such that scrolling on the screen would restrict that portion of the screen from changing. For example, display device 300 may fix a top header, a primary content segment, or the most relevant content segments, from moving as a user manipulates other content on the display device. Query system 220 may determine the relevance of each content segment based on how and from where the query is invocated (e.g., certain content segments may be more relevant to an operator than a passenger providing the same or similar query), how much context is embedded within each content segment, and/or a structured weighting of certain elements of a content segment or within elements comprising the metadata of a content segment. The content segments and control features comprise as much data as possible to account for a variety of possible invocation methods an end user might employ. Accordingly, query system 220 may be able to parse through the structured datasets quickly and accurately to provide a user with the most relevant and enriched content available to enhance the user experience with the vehicle system and to allow the user to quickly navigate a vehicle that may be foreign to them initially.

In some embodiments, query system 220 may identify content segments based on relevancy to one or more user queries. In a non-limiting example, if the user queries "How do I adjust my steering wheel," then query system 220 can start, based on its programming, by finding the object in the sentence (i.e., "steering wheel"). Next, query system 220 may search for metadata that matches that object. If multiple items or content segments have metadata matching "steering wheel," then other words in the query can be used to narrow the selection, such as "adjust," or other words in queries stored in memory may be used for further context.

In some embodiments, content segment 372 may contain information particular to the user, such as augmented details regarding the user's geographic location, user settings or preferences, or other context of the query. In some instances, the augmented data may be presented as a separate content segment with the primary content segment containing static content unaltered based on the context of the user query.

In other embodiments, a descriptive content segment 372 may be presented along with a relevant control system feature on the display screen (not shown). In such embodiments, a user may manipulate the controls, as well as receive the descriptive content for the controls, via interactive user interface 370. For example, a content segment may include an embedded link (e.g., a selectable navigational feature) to a relevant control feature. In a non-limiting example, the embedded link may be included as part of the metadata associated with a content segment. Additionally, the embedded link may be programmed to exist as the content segment itself or as an invisible link hidden within the content segment, such that when a user selects the content segment within the confines of the segment, the link is activated. In response to activating the link, the linked control feature may be presented on the user interface. A user may revert to the previous screen by initiating another command (e.g., cancel, back, etc.). In some instances, the linked control feature may automatically be removed from presentation on the interactive user interface after a predetermined amount of time passes without a user interacting with the presented control feature.

In some instances, vehicle command center 210 may be configured to call a language translation API via network 130 to perform a machine translation on the results before presenting the results on a display device based on a language of the user. The same may also be done when a user inputs a query in a language foreign to operating mechanisms within the vehicle.

In addition, interactive user interface 370 may include related links 374 which a user may select in order to be rerouted to receive content associated with the link. The related links may be determined based on metadata associated with the content segments and the deconstruction of the user query. For example, related links may include links to content segments internally stored in the vehicle, current state of health based on diagnostic or performance data of the vehicle or may include content external to the vehicle (e.g., automatic re-ordering settings, etc.). In another example, a selected link may be configured to display data on a mobile device linked to the vehicle. For example, a user may selected "HEPA Filter Illustrated Replacement Procedure (Mobile App)" which may then launch an application on the user's mobile device illustrating such a procedure. In some embodiments, the mobile application may utilize augmented reality technology to guide a user in replacing the part at issue. Additionally, related queries 378 may be displayed allowing a user to select the related query via touch input to receive information based on the related query.

In a non-limiting example, related content 376 may be presented showing an informational video 377 (with a play button) that was obtained via network 130 determined to be relevant to the search results. Alternatively, informational video 377 may have been located internally to the vehicle. In some embodiments, command center 210 may identify related content 376 via network 130 by either submitting the deconstructed query directly to a network search engine or may first determine what internal content is identified based on the user query and based on the results and metadata associated with the results, determine whether a search query should still be submitted via network 130. In some instances, related content 376 is unnecessary and program instructions may be implemented accordingly. For example, a trigger may be included in the content metadata that signals that a network search should be conducted for related content. In other instances, a machine learning or deep learning algorithm may determine based on evolving user preferences known to the system whether the user would benefit from related content 376 from network 130 due to historical and/or statistical data associated with the user (e.g., number of video views of related content, number of times the user dismisses the content segment or removes it from the viewing display, etc.).

Figure 3E:
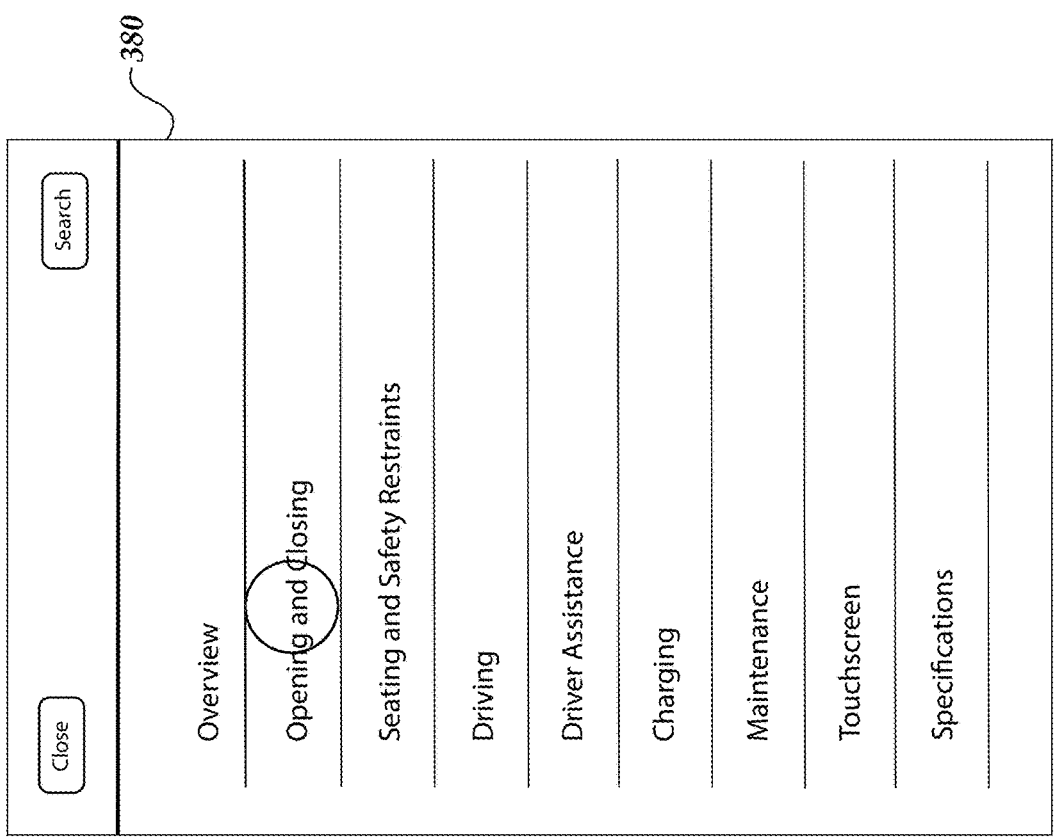
Figure 3F:
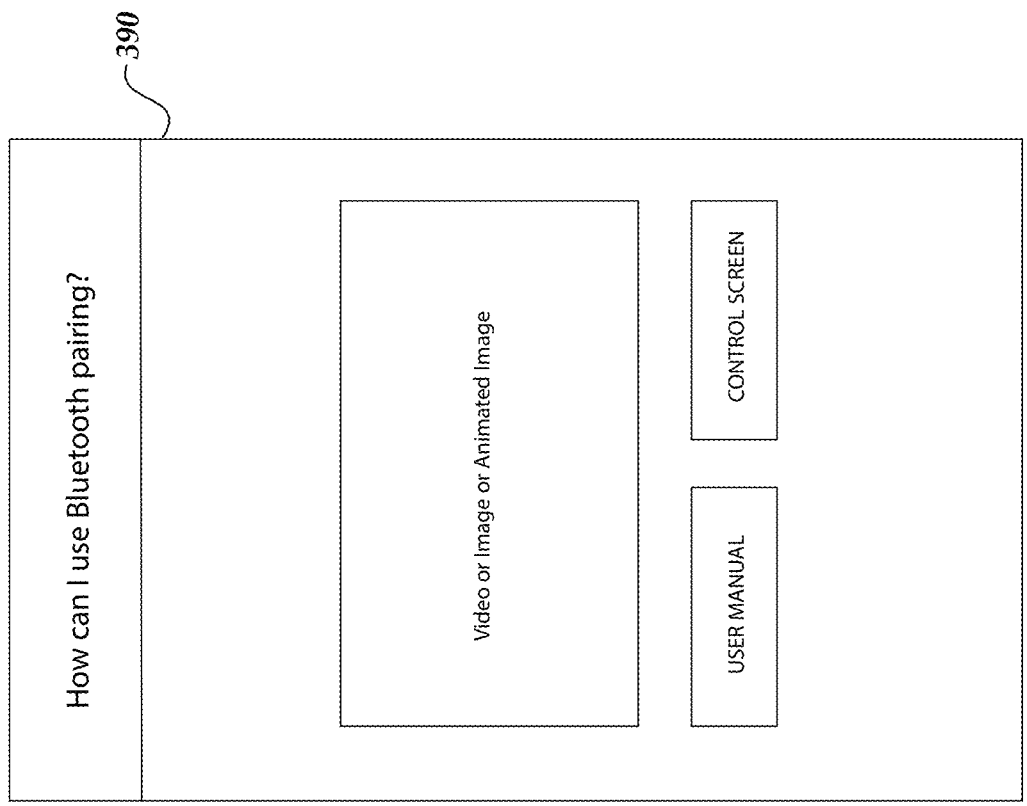

FIG. 3E depicts an example interactive user interface 380 showing an example menu of options for user selection. A menu or index of this type may be displayed in certain embodiments where a user selects a user manual icon or option or may be displayed directly as a result of a query. In some embodiments, each indexed option in the menu may provide a full listing of content segments, a limited listing of content segments, or all content segments available regardless of whether they are considered relevant to a query. In a non-limiting example, a user may be transitioned to a user interface similar to user interface 380 when a user selects an option for accessing the on-board user manual. This option may be presented alongside an option to access a control screen, as shown in FIG. 3F. As shown in the example embodiment of FIG. 3F, query system 220 may also generate display data based on video, image, animated image, or other visual or audio data relevant to the specific query for display in user interface 390. In a non-limiting example, this data may be displayed as a preview of content available through either the user manual tab or control screen tab based on the query. Selection of either option may direct the user to the relevant portion of the user manual, the relevant portion of the control screen or a hybrid of both, with content segments displayed in any situation, as described herein.

Figure 4:
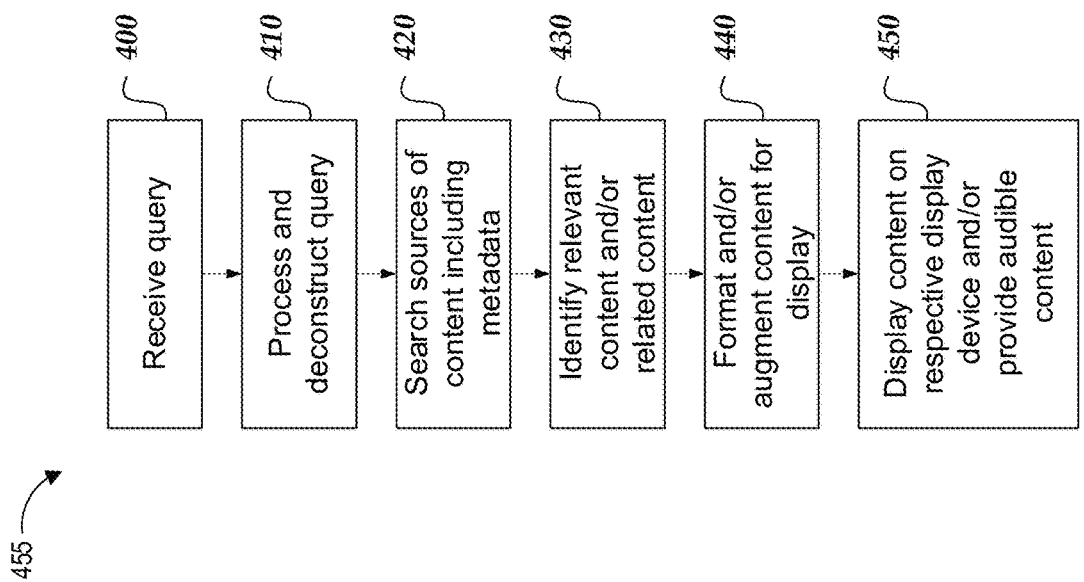
FIG. 4 illustrates a flowchart for receiving and utilizing a user query in a connected vehicle having user interfaces, such as those described with respect to FIGS. 3B-3D.

FIG. 4 depicts a flow chart illustrating an example logical flow of a process 455 for generating and delivering query results in a connected vehicle, according to certain embodiments described herein. The process 455 can be implemented at least partly by the query system 220 of FIG. 2.

At block 400, the query system 220 receives the user query. A user query may be received via a microphone in the vehicle, on a mobile device or through a text-based entry. In addition, a display device may be identified as associated with the query. For example, if a user in a passenger seat initiates the query from a display device on the passenger side of the vehicle (e.g., not associated with the driver or operator), then the system may identify the query as being associated with a passenger rather than the operator of the vehicle. Based on the origin of the query, the number of control features may be suppressed that would otherwise be displayed for other users, such as an operator. For example, a query associated with the driver of a vehicle may result in the display of more control features available on the display screen, than would be available if the query is associated with a passenger.

At block 410, the query system 220 processes and deconstructs the user query to identify keywords, fuzzy keywords, logical patterns, sounds, phrases, etc. In some embodiments, the user query may be recorded by query system 220 and saved in a memory storage device associated with the vehicle. For example, a user query may be related to a sound the vehicle is emitting and thus, the sound may be recorded for use in diagnosing whether the sound is abnormal. At block 420, content databases may be searched based on the user query, including a search through metadata associated with the content. At block 430, relevant content and related content may be identified based on the search results. The relevant content may be prioritized or scored based on degree of relevancy to the query such that the best result may be presented directly to the user, whereas tangentially related content, for example, may be presented as related content. In some embodiments, the content segment with the highest number of matching metadata hits could determine relevancy. In the case where the content identified internally does not exceed a predetermined relevancy threshold, the query system may resort to identifying a content segment over network 130 that is at least tangentially related for presentation. In addition, the system may indicate that the content was identified may not necessarily be relevant and that the user may need to perform a more refined query. A person skilled in the art would understand that various rules may be employed for determining relevancy based on a voice or text query and that for sake of brevity, not all rules or combination of rules may be explicitly described herein.

At block 440, the query system 220 can augment the content segments based on information specific to the vehicle, user, or context of the query (e.g., geographic location, GPS data, maintenance logs, etc.). For example, query system 220 may determine a link a content segment may be augmented by including a link (e.g., a hashtag, hyperlink) to additional content relevant to the user query. The content segments may be formatted to be displayed on one or more display devices. At block 450, the query system 220 can generate interactive or graphical user interface data based on the content segments. The user interface may be displayed on a display device associated with a query (e.g., display 300) or on other display devices depending on the context and content of the query and the user associated with the query. A display device may be associated with a query when the query activation is initiated from the display device, input is received through an interface on a specific display device, or based on which display device is closest to the user making the query. For example, a passenger may cause the display device located closest to the operator to enter listening mode by pressing an activation soft key located on that display device. The passenger may make the query from the passenger side of the vehicle. The system may previously store who the operator and/or passengers of the vehicle are based on facial recognition, voice recognition, or triangulation methods. The query system 220 may receive a signal that, although the operator display device was activated, the query is being made by a passenger. Accordingly, the results of the query may be displayed on a display device associated with the passenger (e.g., passenger door panel, mobile device, etc.). In addition, the results of the query may be read aloud according to safety rules, as described herein (e.g., vehicle speed considerations, etc.). In another example, a query associated with an operator initiated from an operator display device (or as recognized through facial or voice recognition) may result in search results being presented on a passenger side display device, as well as the operator display device or in lieu of presenting results on the operator display device when the vehicle is currently being operated (e.g., above a certain threshold speed).

In a non-limiting example, the results of a query made by a driver may not be presented on a display device if the vehicle is determined to be traveling above a threshold speed, for a certain amount of time, and/or with an acceleration rate above a certain threshold. For example, the results of a query may not be displayed on a screen associated with (e.g., proximate to and/or visible to) the operator until the vehicle decreases to a speed below 2.5 miles per hour for more than 30 seconds. Accordingly, the system may read aloud through the vehicle's speakers certain limited results of the search (e.g., a primary content segment). In some instances, the vehicle system may be in an autonomous operating mode, in which case the content may be displayed to an operator as it would be less distracting than if the operator were actively controlling the vehicle.

In various implementations, the described blocks of the flowchart of FIG. 4 may be performed in an order other than that specifically disclosed, or multiple blocks may be combined in a single block. The example blocks may be performed in serial, in parallel, or in some other manner. Further, blocks may be added to or removed from the disclosed example embodiments.

Execution Environment

Figure 5:
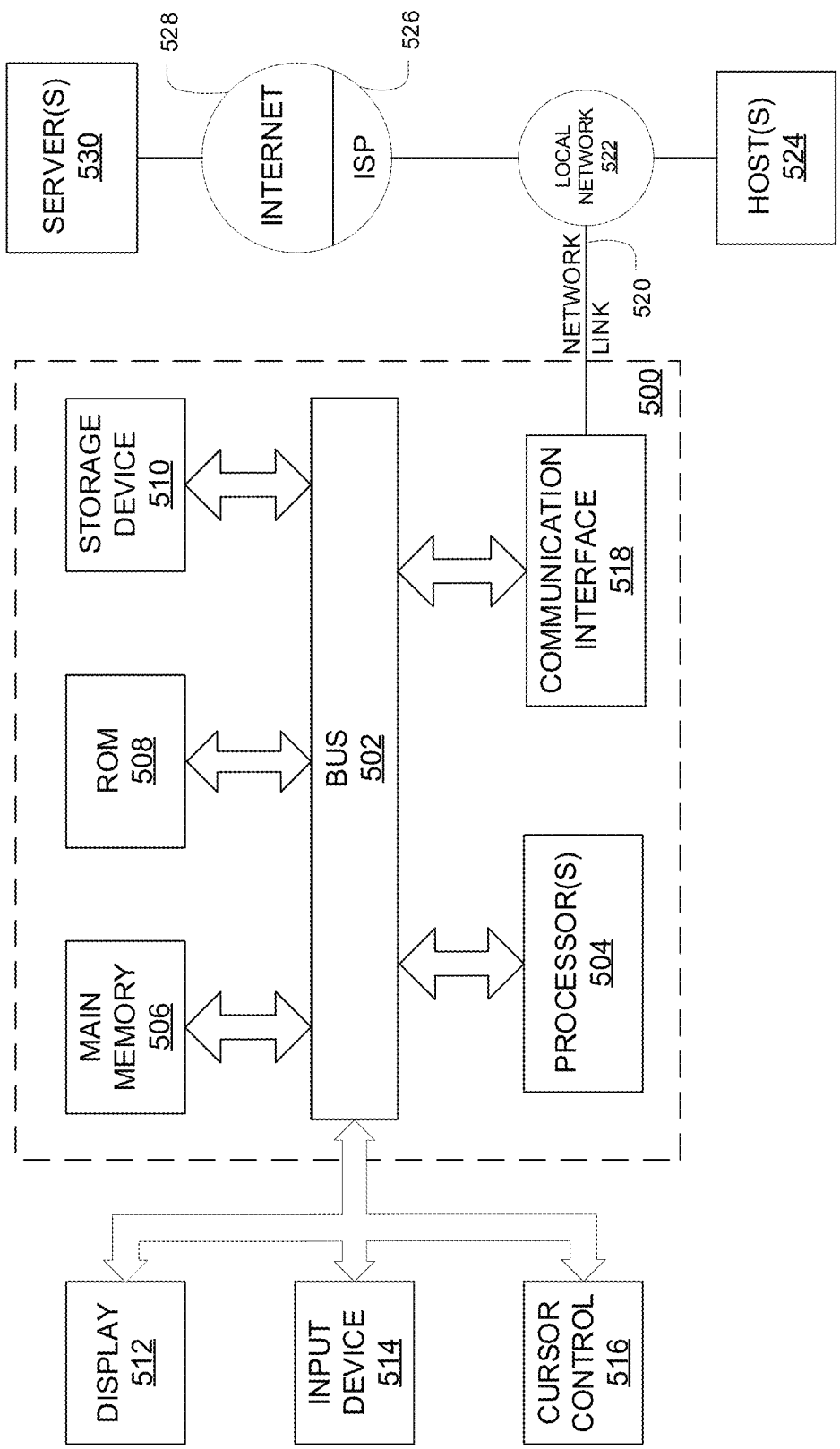
FIG. 5 illustrates a computer system with which certain methods discussed herein may be implemented.

FIG. 5 is a block diagram that illustrates a computer system 500 upon which various embodiments may be implemented. Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. In some embodiments, the vehicle command center 210 or one or more components of vehicle command center 210 may be implemented within computer system 500.

Computer system 500 further includes a read only memory (ROM) 508 or other static storage device coupled to bus 502 for storing static information and instructions for processor 504. A storage device 510, such as a magnetic disk, solid-state drive, optical disk, or USB thumb drive (Flash drive), etc., is provided and coupled to bus 502 for storing information and instructions.

Computer system 500 may be coupled via bus 502 to a display 512, such as a cathode ray tube (CRT) or LCD display (or touch screen), for displaying information to a user. An input device 514, including microphones and alphanumeric or other keys, may be coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as computer executable program instructions that are executed by the computing device(s). Computer system 500 may further, as described below, implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more computer readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

Various forms of computer readable storage media may be involved in carrying one or more sequences of one or more computer readable program instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

As used herein, the term "remote" does not necessarily mean that two devices must be in different physical or geographic locations. Rather, remote devices include devices that communicate via a network connection, such as the Internet or a local area network ("LAN"), rather than devices that are directly connected via a wired or wireless connection. While devices in different physical or geographic locations may be remote devices, devices in the same location (e.g., a single room) and devices physically operated by the same user may also be remote devices.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicate with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The disclosed processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for accessing content for a vehicle, the system comprising:
a database storing vehicle operational content formatted as a plurality of segmented portions each associated with a set of contextual metadata;
a computer-readable memory storing executable instructions; and
at least a processor in communication with the computer-readable memory and programmed by the executable instructions to at least:
receive, over at least one network, updates to individual segmented portions of the plurality of segmented portions including at least an update to a particular segmented portion;
receive data representing a query spoken by a user;
perform natural language processing on the data representing the query;
determine that the query includes a request for a portion of the vehicle operational content based at least in part on a result of the natural language processing;
identify the particular segmented portion of the plurality of segmented portions based at least in part on the set of contextual metadata of the particular segmented portion and the result of the natural language processing;
generate a user interface for presenting the particular segmented portion on a display associated with the vehicle, wherein the user interface is generated to reflect the update to the particular segmented portion;
determine a driving status of one or both of the vehicle and the user; and
when the driving status indicates that it is safe for the user to view information on the display, cause output of the user interface on the display, or when the driving status indicates that it is not safe for the user to view information on the display, store data representing the user interface for later output on the display.

2. The system of claim 1, wherein the processor is further configured to:
store a version of the particular segmented portion corresponding to a version of a user manual of the vehicle that is available at a time of storing the version.

3. The system of claim 1, wherein the processor is further configured to determine the driving status is in motion in response to determining that the vehicle is in motion above a predetermined threshold, and wherein the in-motion driving status indicates that it is not safe for the user to view information on the display.

4. The system of claim 1, wherein the processor is further configured to:
determine whether the query originates from an operator of the vehicle; and
in response to determining the query originates from the operator, cause output of an audible reading of the particular segmented portion through a speaker.

5. The system of claim 1, wherein the display is in a field of view of an operator of the vehicle.

6. The system of claim 1, wherein the processor is further configured to:
determine a set of vehicle controls relevant to the query; and
generate the user interface to include navigational links to the vehicle controls.

7. The system of claim 6, wherein the processor is further configured to generate the user interface to include an animation of instructions included with the set of vehicle controls to animate the relevant set of vehicle controls.

8. The system of claim 1, wherein the processor is further configured to:
receive contextual content from at least one remote data source to augment the particular segmented portion; and
present the contextual content as part of the user interface.

9. A computer-implemented method, comprising:
storing a version of vehicle operational content, the vehicle operational content formatted as a plurality of segmented portions each associated with contextual metadata;
receiving, over at least one network, an update to the vehicle operational content including at least an update to a particular segmented portion of the plurality of segmented portions;
receiving data representing a query spoken by a user;
performing natural language processing on the data representing the query;
determining that the query includes a request for a portion of the vehicle operational content based at least in part on a result of the natural language processing;
identifying the particular segmented portion of the plurality of segmented portions based at least in part on the set of contextual metadata of the particular segmented portion and the result of the natural language processing;
generating a user interface for presenting the particular segmented portion on a display associated with the vehicle, wherein the user interface is generated to reflect the update to the particular segmented portion;
determining a driving status of one or both of the vehicle and the user; and
when the driving status indicates that it is safe for the user to view information on the display, cause output of the user interface on the display, or when the driving status indicates that it is not safe for the user to view information on the display, store data representing the user interface for later output on the display.

10. The computer-implemented method of claim 9, wherein the version of vehicle operational content corresponds to a version of a user manual of the vehicle that is available at a time of storing the version.

11. The computer-implemented method of claim 9, further comprising determining that the driving status is in motion in response to determining that the vehicle is in motion above a predetermined threshold, wherein the in-motion driving status indicates that it is not safe for the user to view information on the display.

12. The computer-implemented method of claim 9, further comprising:
   determining whether the query originates from an operator of the vehicle; and
   in response to determining the query originates from the operator, causing output of an audible reading of the particular segmented portion through a speaker.

13. The computer-implemented method of claim 9, wherein the display is in a field of view of an operator of the vehicle.

14. The computer-implemented method of claim 9, further comprising:
   determining a set of vehicle controls relevant to the query; and
   generating the user interface to include navigational links to the vehicle controls.

15. The computer-implemented method of claim 14, further comprising generating the user interface to include an animation of instructions included with the set of vehicle controls to animate the relevant set of vehicle controls.

16. The computer-implemented method of claim 9, further comprising:
   receiving contextual content from at least one remote data source to augment the particular segmented portion; and
   presenting the contextual content as part of the user interface.

17. A non-transitory, computer-readable medium having stored thereon computer-executable software instructions configured to cause a processor of a computing device to perform operations comprising:
   storing a version of vehicle operational content, the vehicle operational content formatted as a plurality of segmented portions each associated with contextual metadata;
   receiving, over at least one network, an update to the vehicle operational content including at least an update to a particular segmented portion of the plurality of segmented portions;
   receiving data representing a query spoken by a user;
   performing natural language processing on the data representing the query;
   determining that the query includes a request for a portion of the vehicle operational content based at least in part on a result of the natural language processing;
   identifying the particular segmented portion of the plurality of segmented portions based at least in part on the set of contextual metadata of the particular segmented portion and the result of the natural language processing;
   generating a user interface for presenting the particular segmented portion on a display associated with the vehicle, wherein the user interface is generated to reflect the update to the particular segmented portion;
   determining a driving status of one or both of the vehicle and the user; and
   when the driving status indicates that it is safe for the user to view information on the display, cause output of the user interface on the display, or when the driving status indicates that it is not safe for the user to view information on the display, store data representing the user interface for later output on the display.

18. The non-transitory, computer-readable medium of claim 17, wherein determining the driving status of the user comprises determining an origination point for the query.

19. The non-transitory, computer-readable medium of claim 17, wherein the vehicle content comprises a plurality of interactive content segments, including the first segmented portion, and wherein the plurality of interactive content segments comprises discretely packaged information.

20. The non-transitory, computer-readable medium of claim 17, wherein the operations further comprise:
   receiving contextual content from at least one remote data source to augment the particular segmented portion; and
   presenting the contextual content as part of the user interface.

* * * * *

UNITED STATES PATENT AND TRADEMARK OFFICE
CERTIFICATE OF CORRECTION

PATENT NO. : 11,198,446 B2  
APPLICATION NO. : 16/240571  
DATED : December 14, 2021  
INVENTOR(S) : Garcia et al.

Page 1 of 1

It is certified that error appears in the above-identified patent and that said Letters Patent is hereby corrected as shown below:

On the Title Page

Item (71), Column 1, Line 1, under Applicant, delete "Faraday & Future" and insert --Faraday&Future--.

Item (73), Column 1, Line 1, under Assignee, delete "Faraday & Future" and insert --Faraday&Future--.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*